United States Patent Office 3,832,366
Patented Aug. 27, 1974

3,832,366
PROCESS FOR PREPARING 21-CHLORO-17-ACYLOXY-20-KETOSTEROIDS
Christopher M. Cimarusti, Hamilton, N.J., assignor to E. R. Squibb & Sons, Inc., Princeton, N.J.
No Drawing. Filed July 30, 1973, Ser. No. 384,158
Int. Cl. C07c 169/34
U.S. Cl. 260—397.45
5 Claims

ABSTRACT OF THE DISCLOSURE

21-Chloro - 17 - acyloxy - 20-ketosteroids, are prepared from the corresponding 17,21-dihydroxy-20-ketosteroid, cyclic 17,21-orthoesters in a single step process which comprises the reaction of a 17,21-dihydroxy-20-ketosteroid, cyclic 17,21-orthoester with triphenylmethyl chloride.

BRIEF DESCRIPTION OF THE INVENTION

A 17,21-dihydroxy-20-ketopregnene, cyclic 17,21-orthoester may be reacted with triphenylmethyl chloride to yield the corresponding 21-chloro-17-acyloxy-20-ketopregnene. The $\Delta^4$- and the $\Delta^{1,4}$-pregnenes are specifically contemplated. Pregnenes having the formula

I

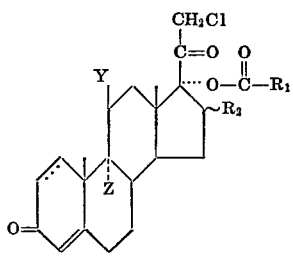

are preferred. In formula I, and throughout the specification, the symbols have the following meanings:

Y is hydroxy, chlorine, or fluorine:
Z is hydrogen or halogen (halogen being defined as F, Cl, Br and I) when Y is hydroxy, and Z is chlorine when Y is chlorine or fluorine;
$R_1$ is alkyl of 1 to 8 carbon atoms; and
$R_2$ is hydrogen, $\alpha$-methyl, $\beta$-methyl, $\alpha$-acyloxy of the formula

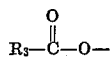

wherein $R_3$ is alkyl of 1 to 8 carbon atoms, $\alpha$-alkoxy of the formula $R_4$—O— wherein $R_4$ is alkyl or phenylalkyl (alkyl being defined as alkyl of 1 to 8 carbon atoms).

The usual routes for the preparation of 21-chloro-17-acyloxypregnenes utilize the corresponding 17,21-dihydroxypregnenes as starting materials. In one route, the 17,21-dihydroxypregnene is converted to its 21-sulfonate derivative which is reacted with an inorganic chloride to give the 21-chloro-17-hydroxypregnene. The 17-hydroxyl group is then selectively acylated (acylation at the 11β-hydroxyl group or at the 3-ketone function may occur) to give the 21-chloro-17-acyloxypregnene. Alternatively, the 17,21-dihydroxypregnene is converted to the corresponding 17,21-cyclic orthoester which is then selectively hydrolyzed to the 17-ester. The 21-hydroxyl group is converted to the 21-chloro derivative via the 21-sulfonate as before. Each of these routes involves a selective reaction which can prove difficult and also requires three or four steps.

DETAILED DESCRIPTION OF THE INVENTION

It has been found that 17,21-dihydroxy-20-ketopregnene, cyclic 17,21-orthoesters may be converted to 21-chloro-17-acyloxy-20-ketopregnenes, by reaction with triphenylmethyl chloride. The reaction is run in an organic solvent, e.g., a halogenated hydrocarbon such as dichloromethane or chloroform at the reflux temperature of the solvent, e.g., a halogenated hydrocarbon such as dichlorotime ranging from 30 minutes to 4 hours, preferably for about 1 to 2 hours. The reaction is preferably run in an inert atmosphere (e.g., nitrogen or argon).

The 17,21-dihydroxy-20-ketopregnene, cyclic 17,21-orthoesters which are used in the process of this invention are obtained from the corresponding 17,21-dihydroxy-20-ketopregnenes by reaction with a trialkylorthoester. The reaction is run in a polar organic solvent, e.g., dimethylformamide or dimethylsulfoxide, at a temperature of from 100° C. to 160° C., preferably 110° C. to 130° C., for a period of time ranging from 2 hours to 48 hours, preferably 4 hours to 24 hours. The reaction is run in an inert atmosphere, e.g., nitrogen or argon, in the presence of an acid catalyst, e.g., p-toluenesulfonic acid. Thus, in order to obtain a 17,21-dihydroxy-20-ketopregnene, cyclic 17,21-orthoester which may be converted to the preferred 21-chloro-pregnenes of formula I, it is necessary to react a steroid of the formula

II

[structure]

with a trialkylorthoester of the formula

III
$$R_1C(OR_5)_3$$

wherein $R_5$ is alkyl of 1 to 4 carbon atoms. The 17,21-dihydroxy-20-ketopregnene, cyclic 17,21-orthoesters obtained have the formula:

IV

[structure]

The steroids produced by the process of this invention are physiologically active substances that possess glucocorticoid and anti-inflammatory activity. They can be used topically in the treatment of skin conditions such as dermatitis, sunburn, neurodermatitis, eczema, and anogenital pruritus. The compounds obtained by the process of this invention may be used in the range of 0.01 to 5.0% by weight, preferably 0.05 to 2.0% by weight in a conventional cream or lotion.

The following examples are specific embodiments of this invention.

EXAMPLE 1

*21-Chloro-9-fluoro-11β,17-dihydroxypregn-4-ene-3,20-dione, 17-valerate*

(a)

*9-Fluoro-11β,17,21-trihydroxypregn-4-ene-3,20-dione, cyclic 17,21-methylorthovalerate*

A solution of 5 g. of 9-fluoro-11β,17,21-trihydroxypregn-4-ene-3,20-dione in 10 ml. each of dimethylformamide and trimethylorthovalerate is heated at 125° C. under a blanket of nitrogen for 5 hours with 50 mg. of p-toluenesulfonic acid. The solution is cooled, 0.2 ml. of pyridine added, and the solution poured into water and extracted with chloroform. The chloroform solution is washed with water, dried, and evaporated in vacuo and the residue crystallized from acetone-hexane to give 3.0 g. of 9-fluoro-11β,17,21-trihydroxypregn-4-ene-3,20-dione, cyclic 17,21-methylorthovalerate, melting point 172° C.–175° C.

(b) 21-Chloro-9-fluoro-11β,17-dihydroxypregn-4-ene-3,20-dione, 17-valerate

A solution of 1 g. of 9-fluoro-11β,17,21-trihydroxypregn-4-ene-3,20-dione, cyclic 17,21-methylorthovalerate and 0.6 g. of triphenylmethyl chloride in 6 ml. of dichloromethane is refluxed for 1 hour under a blanket of nitrogen. The solvent is evaporated in vacuo and the residue is chromatographed on a 20 x 20 cm.-2 mm. silica gel plate developed with 1:1 chloroform-ethyl acetate. The UV-active band with $R_f$ slightly above that of the starting material is excised and eluted with chloroform-methanol; the residue obtained upon solvent removal crystallizes from acetone-hexane to give 270 mg. of 21-chloro-9-fluoro-11β,17-dihydroxypregn-4-ene-3,20-dione, 17-valerate, melting point 209° C.–211° C.

EXAMPLE 2

*21-Chloro-9-fluoro-11β,17-dihydroxy-16α-methoxypregn-4-ene-3,20-dione, 17-acetate*

(a) 9-Fluoro-16α-methoxy-11β,17,21-trihydroxypregn-4-ene-3,20-dione, cyclic 17,21-ethylorthoacetate A mixture of 0.48 g. of 9-fluoro-16α-methoxy-11β,17,21-trihydroxypregn-4-ene-3,20-dione, 10 mg. of p-toluenesulfonic acid, 1 ml. of triethylorthoacetate and 1 ml. of dimethylformamide is heated at 120° C. under a blanket of nitrogen for 15 hours. The solution is cooled, 0.1 ml. of pyridine added, and the solution poured into 100 ml. of water and extracted with chloroform. The chloroform solution is washed with water, dried, and evaporated in vacuo to give an oil which is purified by column chromatography over neutral alumina. Elution with 4:1 chloroform-hexane gives 301 mg. of 9-fluoro-16α-methoxy-11β,17,21-trihydroxypregn-4-ene-3,20-dione, cyclic 17,21-ethylorthoacetate.

(b) 21-Chloro-9-fluoro-11β,17-dihydroxy-16α-methoxypregn-4-ene-3,20-dione, 17-acetate A solution of 300 mg. each of 9-fluoro-16α-methoxy-11β,17,21-trihydroxypregn-4-ene-3,20-dione, cyclic 17,21-ethylorthoacetate in 5 ml. of dichloromethane is refluxed for 1 hour, cooled, and applied to a 10 g. silica gel column. Elution with dichloromethane-chloroform gives 94 mg. of 21-chloro-9-fluoro-11β,17-dihydroxy-16α-methoxypregn-4-ene-3,20-dione, 17-acetate, melting point 245° C.–248° C., dec., when recrystallized from acetone-hexane.

EXAMPLE 3

*21-Chloro-9-fluoro-11,β,16α,17-trihydroxypregna-1,4-diene 3,20-dione, 16,17-diacetate*

A solution of 3.3 g. of 9-fluoro-11β,16α,17,21-tetrahydroxypregna-1,4-diene-3,20-dione, cyclic 17,21-ethylorthoacetate, 16-acetate and 2.0 g. of triphenylmethyl chloride in 25 ml. of dichloromethane is refluxed for 1 hour under nitrogen, cooled, and stirred for 65 hours at room temperature. The resulting solution is chromatographed on a 100 g.-alumina (neutral, activity II) column. Elution with 4:1 chloroform-dichloromethane gives 2 g. of impure product. This is chromatographed on a 70 g.-silica gel column. Elution with 9:1 chloroform-hexane give 1.3 g. of pure material. Two recrystallizations from methanol chloroform gives 0.8 g. of 21-chloro-9-fluoro-11β,16α,17-trihydroxypregna-1,4-diene-3,20-dione, 16,17-diacetate melting point 296° C.–298° C. dec.

Anal.
Calcd. for $C_{25}H_{30}ClFO_7$: C, 60.42; H, 6.09; Cl, 7.14; F, 3.82.
Found: C, 60.40; H, 5.87; Cl, 7.43; F, 3.71.

EXAMPLE 4

*21-Chloro-9-fluoro-11β,16α,17-trihydroxypregna-1,4-diene-3,20-dione, 16-acetate, 17-propionate*

A solution of 3.2 g. of 9-fluoro-11β,16α,17,21-tetrahydroxypregna-1,4-diene-3,20-dione, cyclic 17,21-ethylorthopropionate, 16-acetate and 1.9 g. of triphenylmethylchloride in 25 ml. of dichloromethane is refluxed under nitrogen for 90 minutes, cooled, and stirred at room temperature for 68 hours. The resulting solution is chromatographed on a 100 g.-alumino (neutral-activity II) column. Elution with dichloromethane gives 2.2 g. of impure product which is chromatographed on an 80 g.-silica gel column. Elution with chloroform gives 1.4 g. of TLC pure product. Two recrystallizations from acetone-hexane gives 750 mg. of 21-chloro-9-fluoro-11β,16α,17-trihydroxypregna-1,4-diene-3,20-dione, 16-acetate, 17-propionate melting point 285° C.–287° C.

Anal.
Calcd. for $C_{26}H_{32}ClFO_7$: C, 61.11; H, 6.31; Cl, 6.94; F, 3.72
Found: C, 61.37; H, 6.47; Cl, 6.84; F, 3.71.

EXAMPLES 5–8

Following the procedure of Example 3 but substituting the 17,21-dihydroxy-20-ketopregnene, cyclic 17,21-orthoester of Column I for 9-fluoro-11β,16α,17,21-tetrahydroxypregna-1,4-diene-3,20-dione, cyclic 17,21-ethylorthoacetate, 16-acetate, the 21-chloro-17-hydroxy-20-ketopregnene, 17-ester of Column II is obtained.

| Example | Column I | Column II |
|---|---|---|
| 5 | 9-fluoro-11β,17,21-trihydroxy-16α-methylpregna-1,4-diene-3,20-dione, cyclic 17,21-ethyl orthoacetate. | 21-chloro-9-fluoro-11β,17-dihydroxy-16α-methylpregna-1,4-diene-3,20-dione, 17-acetate. |
| 6 | 9-fluoro-16α-ethoxy-11β,17,21-trihydroxypregna-1,4-diene-3,20-dione, cyclic 17,21-ethyl orthoacetate. | 21-chloro-9-fluoro-11β,17-dihydroxy-16α-ethoxypregna-1,4-diene-3,20-dione, 17-acetate. |
| 7 | 9,11β-dichloro-17,21-dihydroxypregna-1,4-diene-3,20-dione, cyclic 17,21-ethyl orthopropionate. | 9,11β,21-trichloro-17-hydroxypregna-1,4-diene-3,20-dione, 17-propionate. |
| 8 | 9-fluoro-11β,17,21-trihydroxy-16β-methylpregna-1,4-diene-3,20-dione, cyclic 17,21-ethyl orthopropionate. | 21-chloro-9-fluoro-11β,17-dihydroxy-16β-methylpregna-1,4-diene-3,20-dione, 17-propionate. |

What is claimed is:

1. A process for preparing a 21-chloro-17-acyloxy-20-ketopregnene from a 17,21-dihydroxy-20-ketopregnene, cyclic 17,21-orthoester which comprises reacting a 17,21-dihydroxy-20-ketopregnene, cyclic 17,21-orthoester with triphenylmethyl chloride in an organic solvent at the reflux temperature of the solvent.

2. A process in accordance with claim 1 wherein the 17,21-dihydroxy-20-ketopregnene, cyclic 17,21-orthoester has the formula

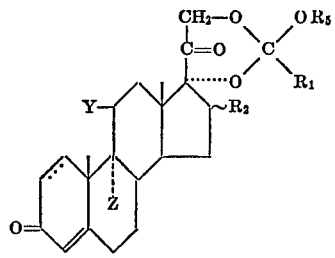

wherein Y is hydroxy, chlorine, or fluorine; Z is hydrogen or halogen when Y is hydroxy, and Z is chlorine when Y is chlorine or fluorine; $R_1$ is alkyl of 1 to 8 carbon atoms; $R_2$ is hydrogen, α-methyl, β-methyl, α-acyloxy of the formula

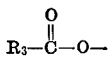

wherein $R_3$ is alkyl of 1 to 8 carbon atoms, α-alkoxy of the formula $R_4$—O— where in $R_4$ is alkyl or phenyl-alkyl; and $R_5$ is alkyl of 1 to 4 carbon atoms.

3. A process in accordance with claim 2 wherein the 17,21-dihydroxy-20-ketopregnene, cyclic 17,21-orthoester has the formula

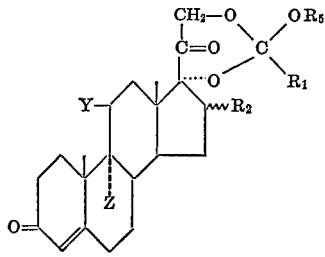

4. A process in accordance with claim 2 wherein the 17,21-dihydroxy-20-ketopregnene, cyclic 17,21-orthoester has the formula

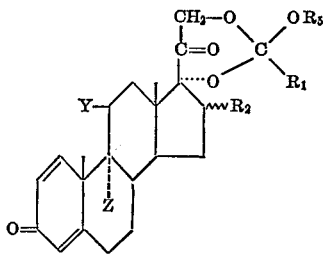

5. A process in accordance with claim 2 wherein the organic solvent is a halogenated hydrocarbon.

References Cited

Newman et al., J.A.C.S. *95*, p. 278 (1973).

HENRY A. FRENCH, Primary Examiner

U.S. Cl. X.R.

260—239.55 D

UNITED STATES PATENT OFFICE
CERTIFICATE OF CORRECTION

K538

Patent No. 3,832,366      Dated August 27, 1974

Inventor(s) Christopher M. Cimarusti

It is certified that error appears in the above-identified patent and that said Letters Patent are hereby corrected as shown below:

Column 2, please insert the following between line 5 and line 6:

-- methane or chloroform at the reflux temperature of the solvent. The reaction mixture is refluxed for a period of --.

Signed and sealed this 29th day of October 1974.

(SEAL)
Attest:

McCOY M. GIBSON JR.
Attesting Officer

C. MARSHALL DANN
Commissioner of Patents

Notice of Adverse Decision in Interference

In Interference No. 99,170, involving Patent No. 3,832,366, C. M. Cimarusti, PROCESS FOR PREPARING 21-CHLORO-17-ACYLOXY-20-KETO-STEROIDS, final judgment adverse to the patentee was rendered July 2, 1976, as to claims 1, 2, 4 and 5.

[*Official Gazette November 30, 1976.*]